(12) United States Patent
Volatier et al.

(10) Patent No.: US 10,143,335 B2
(45) Date of Patent: Dec. 4, 2018

(54) COOKING APPARATUS WITH CUSHIONED PANEL

(71) Applicant: SEB S.A., Ecully (FR)

(72) Inventors: Sébastien Volatier, Dijon (FR); Annabelle Goyon, Marcilly-sur-Tille (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 15/541,579

(22) PCT Filed: Jan. 5, 2016

(86) PCT No.: PCT/FR2016/050008
§ 371 (c)(1),
(2) Date: Jul. 5, 2017

(87) PCT Pub. No.: WO2016/110639
PCT Pub. Date: Jul. 14, 2016

(65) Prior Publication Data
US 2017/0325632 A1 Nov. 16, 2017

(30) Foreign Application Priority Data
Jan. 6, 2015 (FR) ...................................... 15 50068

(51) Int. Cl.
*A47J 37/06* (2006.01)
(52) U.S. Cl.
CPC ................................. *A47J 37/0611* (2013.01)
(58) Field of Classification Search
CPC ...................... A47J 37/0611; A47J 2037/0617
(Continued)

(56) References Cited

U.S. PATENT DOCUMENTS 3,776,124 A  12/1973 Morley
5,341,727 A   8/1994 Dickson
(Continued)

FOREIGN PATENT DOCUMENTS

FR  2 866 539 A1   8/2005
FR  2866539 A1 *  8/2005 .............. A47J 36/12
FR  2 991 862 A1  12/2013

OTHER PUBLICATIONS

English Translation, Volatier et al. (CA2875954), Dec. 19, 2013.*
(Continued)

*Primary Examiner* — Dana Ross
*Assistant Examiner* — James Sims, III
(74) *Attorney, Agent, or Firm* — Pillsbury Winthrop Shaw Pittman LLP

(57) ABSTRACT

A cooking apparatus includes a first structure including a heating plate for cooking food; a second structure including a heating plate for cooking food; and a frame on which the second structure rests; and the first structure and the second structure are hingedly connected to one another by at least one hinge between an open position or a closed position or else a cooking position, which is an intermediate position between the open position and the closed position, wherein the cooking apparatus includes a device for cushioning the weight of the first structure when the latter is in the cooking position or in the closed position, and in the cooking position the cushioning device makes it possible to keep the first structure in contact with the one or more food items to be cooked.

7 Claims, 2 Drawing Sheets

(58) Field of Classification Search
USPC .......................... 99/372, 374, 377, 379, 380
See application file for complete search history.

(56) References Cited

U.S. PATENT DOCUMENTS

| 2010/0107894 A1* | 5/2010 | Scholz | A47J 37/0611 |
| | | | 99/372 |
| 2010/0186601 A1* | 7/2010 | Gulkanat | A47J 37/0611 |
| | | | 99/372 |
| 2014/0217084 A1* | 8/2014 | Jackson | A47J 37/0611 |
| | | | 219/395 |

OTHER PUBLICATIONS

International Preliminary Report on Patentability and the Written Opinion of the International Searching Authority as issued in International Patent Application No. PCT/FR2016/050008, dated Jul. 11, 2017.
International Search Report as issued in International Patent Application No. PCT/FR2016/050008, dated May 4, 2016.

* cited by examiner

COOKING APPARATUS WITH CUSHIONED PANEL

CROSS-REFERENCE TO RELATED APPLICATIONS

This application is the U.S, National Stage of PCT/FR2016/050008, filed Jan. 5, 2016, which in turn claims priority to French patent application number 1550068 filed Jan. 6, 2015, The content of these applications are incorporated herein by reference in their entireties.

This invention concerns an electrical household cooking appliance including two panels articulated together, such as, for example, a waffle iron, a meat grill or a toasted sandwich grill.

We are aware of an electrical household cooking appliance including two structures articulated together by a hinge between an open position and a closed position, and driven at a certain speed toward their open position by a drive member.

Patent FR2866539 describes such an electrical household cooking appliance.

However, electrical household appliances of this type do not include a system that permits limiting the weight of one of the structures. On the contrary, the system described tends to raise to the maximum level one of the two structures which is halted at the end stop as it rises.

We are also aware of electrical household appliances including two structures articulated together by a hinge between an open position and a closed position, and which do not include a drive member. In this case, food placed between these two structures can be crushed by the weight of the upper structure if the food is too fragile.

One goal of this invention is to respond to the aforementioned disadvantages of the prior art, and in particular to propose an electrical household appliance whose goal is to have a function that permits limiting the crushing of fragile food during cooking, caused by the weight of the structure positioned above the food.

To this end, one aspect of the invention concerns a cooking appliance including:
  a first structure including a heating plate to cook food; and
  a second structure including a heating plate to cook food; and
  a frame on which the second structure rests and,
  the first structure and the second structure are articulated together by at least one hinge between an open position or a closed position or a cooking position, which is an intermediate position between the open position and the closed position, characterized in that the cooking appliance includes a device for cushioning the weight of the first structure when the latter is in the cooking position or in the closed position, and in the cooking position the cushioning device permits keeping the first structure in contact with the food to be cooked.

Thanks to this cushioning device, the weight of the first structure can be reduced when cooking fragile food and thus limit the crushing of fragile food, while keeping the food in contact with the first structure in order to keep cooking the food on both sides.

According to one embodiment, the at least one hinge includes at least one shaft connected to the frame. The hinge allows the two structures to pivot between each other.

According to one embodiment, the cushioning device consists of at least one elastic means placed on the at least one shaft. Having a cushioning device consisting of elastic means contributes to a fluid and linear cushioning of the first structure. Placing the one or more elastic means on the shaft permits having a compact cushioning device and thus a cooking appliance that permits limiting the crushing of fragile food and that is also compact. In addition to the compactness, this permits having a cushioning device that is simple to achieve. In addition, such a system is inexpensive and easy to integrate.

According to one embodiment, the diameter of the at least one elastic means is greater than the diameter of the at least one shaft. In this manner, friction is prevented between the one or more elastic means and the shaft.

According to one embodiment, the at least one elastic means includes a first attachment point which is connected to the at least one shaft and a second attachment point which is connected to the frame of the cooking appliance. In this manner, the elastic means works by cushioning.

According to a first embodiment of the cushioning device, the latter consists of at least one torsion spring. One advantage of having an elastic means consisting of a torsion spring is to have an elastic means that is inexpensive and easy to integrate on a shaft.

According to a second embodiment of the cushioning device, the latter consists of at least one compression spring. The compression spring permits avoiding a positioning on the shaft to be placed only in the cooking appliance.

According to one embodiment, the effect of the cushioning device is maximal in the closed position and null in an upper position.

According to one embodiment, the cushioning device offsets between 40% and 80% of the weight of the first structure and preferentially 50% in the cooking position. In this manner, and in the cooking position, fragile food is always in contact with the first structure but without being crushed and the cooking time is not affected.

According to one embodiment, the first structure is mounted on the at least one hinge by means of at least one side arm that is mobile relative at least to the second structure. The advantage of having at least one side arm that is mobile relative at least to the first structure permits having the first and the second structure that can remain parallel with each other when the first and second structure are separated from each other.

According to one embodiment, the cooking appliance includes a rocker which is connected to the at least one shaft and which engages with a means of measuring the pivoting angle of the rocker in order to estimate the thickness of the food.

Other advantages and features of this invention will appear in the description of the embodiment provided as a non-restrictive example and illustrated by the attached drawings.

Figure 1:
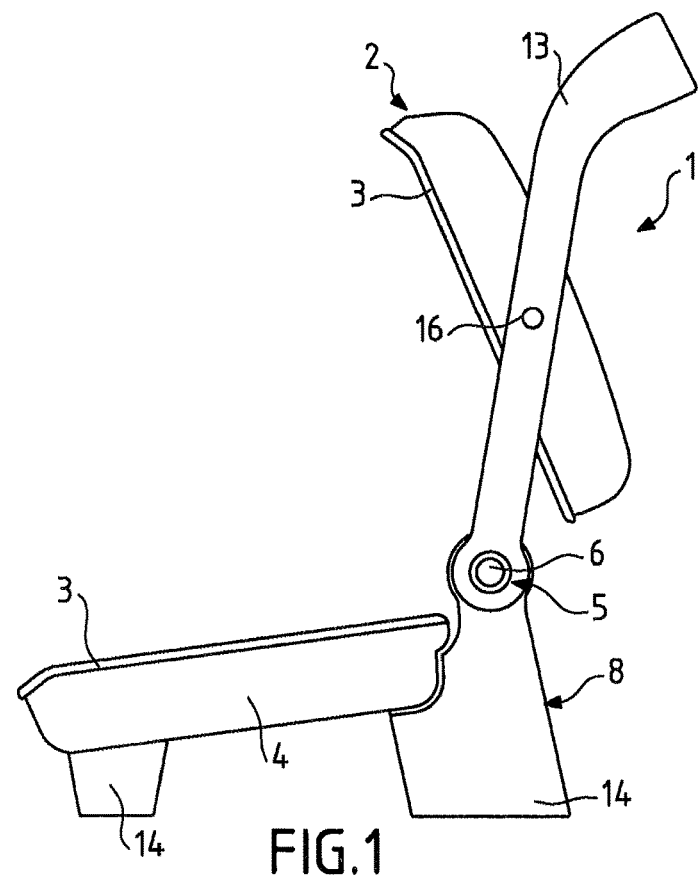
FIG. 1 is a side view of an electrical household appliance conforming to this invention in the open position.

Traditionally, as can be seen in FIG. 1, an electrical household cooking appliance 1 is of the type of the one described in the patent application FR1255600. It includes a first structure 2 and it is anticipated that the electrical household appliance 1 will be equipped with a second structure 4. The first structure 2 is positioned above the second structure 4. The first structure 2 is mobile relative to the second structure 4 to produce a spacing movement in order to be able to place the food to be cooked between these two structures 2, 4.

Each structure 2, 4 forms a cooking sub-assembly and includes a shell forming the body of the sub-assembly, a heating plate 3 which is supported by the shell and which is adapted to cook a food, and a heating device (an electrical resistor) which is placed between the shell and the heating plate 3 and is adapted to transmit thermal energy to the heating plate 3. Possibly, each structure 2, 4 includes a thermal reflector which is placed between the electrical resistor and the shell in order to reduce the thermal energy transmitted to the latter.

Figure 2:
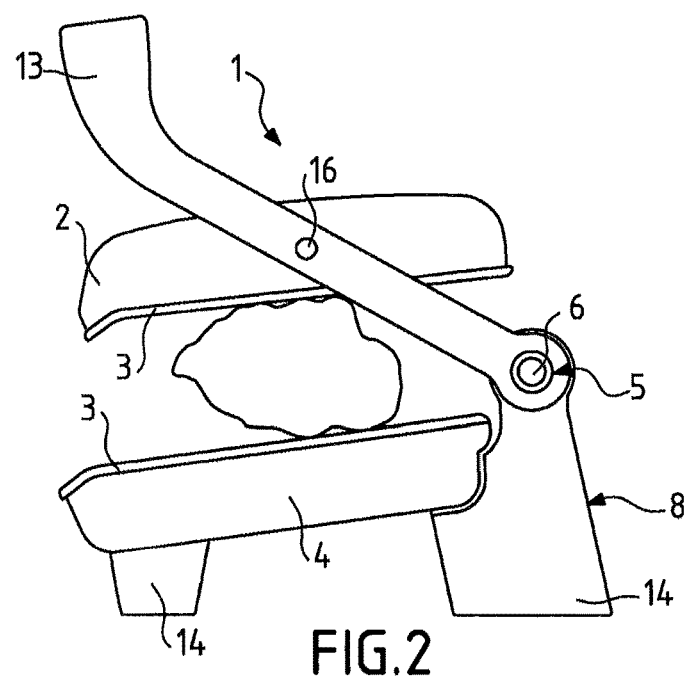
FIG. 2 is a side view of an electrical household appliance conforming to this invention in the cooking position.
Figure 3:
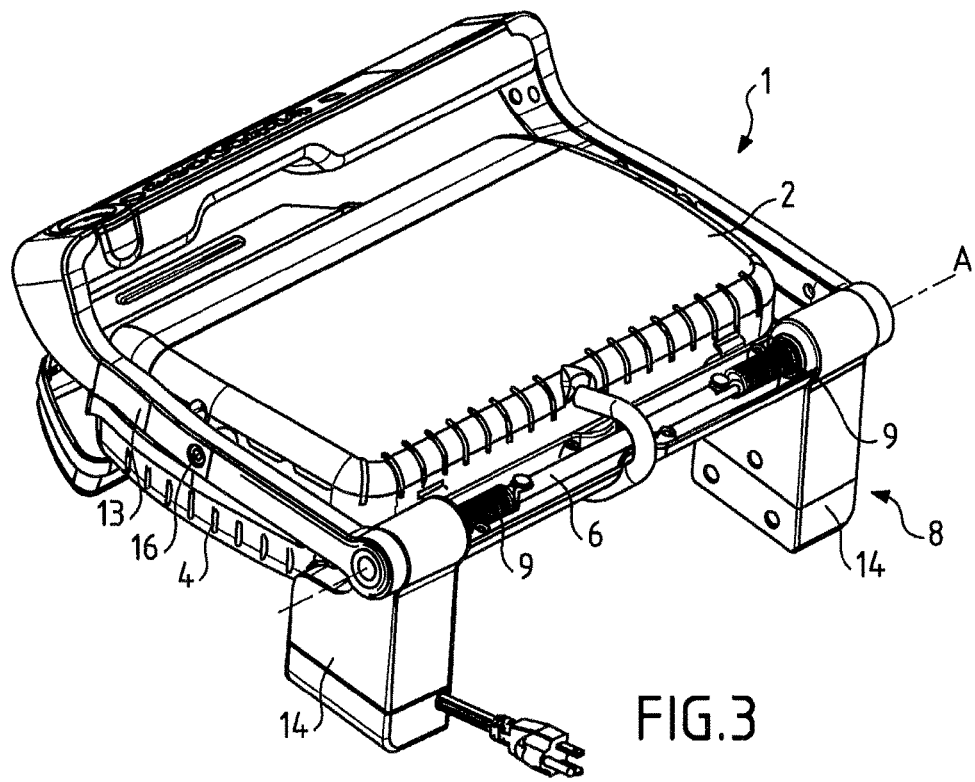
FIG. 3 is a rear view of an electrical household appliance conforming to this invention.
Figure 4:
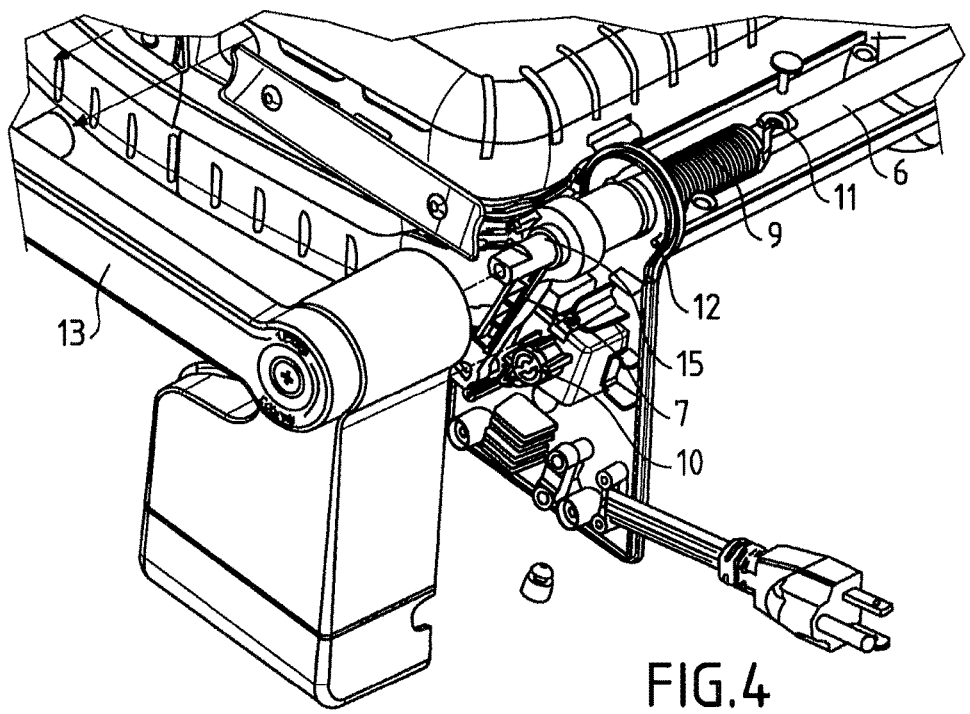
FIG. 4 is an exploded rear view of the hinge of the appliance.

The two structures 2, 4 are articulated together by a hinge 5 between a closed position, as visible in FIGS. 3 and 4, in which the first structure 2 covers the second structure 4, an open position, as visible in FIG. 1, in which the heating plate 3 of the second structure 4 is accessible in order to be able to place there the food to be cooked and to remove it from there, and a cooking position, as visible in FIG. 2, in which a food is placed between the two structures 2, 4 and the two structures 2, 4 are in contact with the food in this cooking position.

The second and first structures 4, 2 are adapted to cook against them, by conduction, the food or foods placed between the heating plates 3. More specifically, the food is cooked against the two heating plates 3. The food or foods may be meat, fish, vegetables or others.

The electrical household appliance 1 includes a frame 8 on which rests the second structure 4. Possibly this frame 8 consists of one or more feet 14 positioned at the front or rear of the electrical household appliance 1, as in the case in the context of the invention, where there are at least two feet 14 positioned at the rear of the electrical household appliance 1 and two feet 14 positioned at the front.

As visible in FIGS. 3 and 4 which detail the construction of the hinge 5, the hinge 5 is formed of a shaft 6 which crosses the two rear feet 14 of the electrical household appliance 1, in order to form a pivot point. The shaft 6 may pivot according to a rotation axis A. To this shaft 6 are connected two side arms 13. The two side arms 13 support the first structure 2 which is mounted pivoting between the two side arms 13 by means of a pivot point 16.

In the context of the invention, the shaft 6 connects the two rear feet 14, and in one variant there can also be several independent shafts, notably a shaft 6 situated on each rear foot of the electrical household appliance 1.

In order to limit crushing of the food, at the hinge 5 there is a system to offset (also called a cushioning device) the weight of the first structure 2 which permits offsetting between 40% and 80% of the weight of the first structure 2, which prevents crushing fragile food when the electrical household appliance 1 is in the cooking position, while ensuring contact with the food.

As visible in FIG. 3, the device for cushioning the weight consists of two elastic means. The elastic means are placed on the shaft 6 of the hinge 5.

These elastic means are torsion springs 9 as visible in FIGS. 3 and 4. In this case, the diameter of the torsion springs 9 is greater than the diameter of the shaft 6 of the hinge 5. This permits, among other things, preventing friction. The torsion springs 9 include two attachment points. A first attachment point 11 is connected to the shaft 6 of the hinge 5. A second attachment point 12 is connected to the frame 8 (or to the foot 14) of the electrical household appliance 1.

It is possible to perform the cushioning with a single torsion spring connected to one of the two feet of the electrical household appliance 1.

In another variant of the elastic means, the latter consist of compression springs, this time integrated directly in the foot of the electrical household appliance 1.

In one or the other variant of the elastic means, the effect of the cushioning device is maximal in the closed position, that is, when the two cooking plates are in contact, and null in an upper position, that is, when the first structure (or the side arms 13 holding the latter) and the second structure 2, 4 form an angle greater than 90°.

In a preferential embodiment, the elastic means are calculated to offset approximately 50% of the weight of the first structure 2. In the event that the first structure 2 weighs approximately 1.3 kg, at least two springs of 650 Newtons each are necessary.

As visible in FIG. 4, the electrical household appliance 1 also includes a measuring device that permits measuring the thickness of the food placed in the electrical household appliance 1. The latter is described in the patent application FR1255600 and it includes a measuring means 10 connected to a rocker 7 which is able to pivot in the electrical household appliance 1 by means of an extremity 15 connected to the shaft 6.

The rocker 7 may be rigidly connected to the shaft 6, by being, for example, fitted tightly around it. In this way, during the pivoting or rotation of the shaft 6, the latter also causes the rotation of the rocker 7. It can also be anticipated that the rocker 7 is mounted on the shaft 6 with sufficient play to allow the rocker to rotate or pivot. Unlike the variant with the rocker 7 mounted rigidly, during rotation of the shaft 6, the rocker pivots via other means connected to the shaft 6.

It will be understood that various modifications and/or improvements obvious to the person skilled in the art may be made to the embodiment of the invention described in this description without departing from the context of the invention defined by the attached claims.

The invention claimed is:

1. A cooking appliance including:
   a first structure including a heating plate to cook food;
   a second structure including a heating plate to cook food;
   a frame on which rests the second structure, and the first structure and the second structure being hingedly connected to one another by at least one hinge, the first and second structures configured to be moved between (a) an open position wherein the heating plates of the first and second structures are positioned relatively away from each other such that the heating plate of the second structure is accessible for placing or removing food thereon, (b) a closed position wherein the first structure covers the second structure and the heating plates are in contact, and (c) a cooking position wherein food is placed between and in contact with both of the heating plates of the first and second structures and which is an intermediate position between the open position and the closed position, and said hinge includes at least one shaft connected to the frame, the at least one shaft being configured to pivot about a rotation axis, and
   at least one spring for cushioning the weight of the first structure when the first structure is placed in the cooking position, which permits keeping the first structure in contact with the food or foods to be cooked, or when the first structure is placed in the closed position with the second structure, wherein the at least one spring consists of at least one torsion spring, said at least one spring is in axial alignment with the at least one shaft along the rotation axis and wherein the at least one spring includes (a) a first attachment point which is connected to the at least one shaft and (b) a second attachment point which is connected to the frame of the cooking appliance.

2. The cooking appliance according to claim 1, wherein the at least one spring offsets between 40% and 80% of the weight of the first structure in the cooking position.

3. The cooking appliance according to claim 2, wherein the at least one spring offsets 50% of the weight of the first structure in the cooking position.

4. The cooking appliance according to claim 1, wherein the first structure is mounted on the at least one hinge using at least one side arm that is connected to the at least one shaft, and wherein the at least one side arm is configured to be mobile relative at least to the second structure.

5. The cooking appliance according to claim 4, further including a rocker which is connected to the at least one shaft and which is configured to rotate with the at least one shaft.

6. The cooking appliance according to claim 1, wherein said at least one spring is positioned on the shaft and wherein a diameter of the at least one spring is greater than a diameter of the at least one shaft in order to prevent friction.

7. The cooking appliance according to claim 1 wherein a cushioning effect of the at least one spring is maximal in the closed position and null when an angle formed between the first and the second structure is greater than 90°.

* * * * *